United States Patent

Morawski et al.

[15] 3,707,294
[45] Dec. 26, 1972

[54] MULTI-JAW CHUCK

[72] Inventors: London T. Morawski, Mt. Clemens; John J. Parker, Warren, both of Mich.

[73] Assignee: The John J. Parker Living Trust, by said Parker, a part interest

[22] Filed: Dec. 24, 1970

[21] Appl. No.: 101,212

[52] U.S. Cl. .....................279/110, 279/60, 279/123
[51] Int. Cl. ...........................................B23b 31/10
[58] Field of Search.................279/60, 110, 119, 123

[56] References Cited

UNITED STATES PATENTS 3,248,122   4/1966   Roddy..................................279/110

Primary Examiner—Francis S. Husar
Attorney—Barnes, Kisselle, Raisch & Choate

[57] ABSTRACT

A chuck having a plurality of jaw rods arranged within bores inclined relative to the axis of the chuck. The jaw rods may be moved axially in opposite directions to decrease and increase the diameter of the circle defined by the chuck jaws to thereby engage and disengage the peripheral surface of a workpiece. The rear portions of the rods are interengaged with a jaw actuator by means of a plug which is insertable and removable through a central bore in the front of the chuck. Removal of the plug from the chuck enables the jaw rods to be removed from the front of the chuck.

9 Claims, 1 Drawing Figure

PATENTED DEC 26 1972
3,707,294
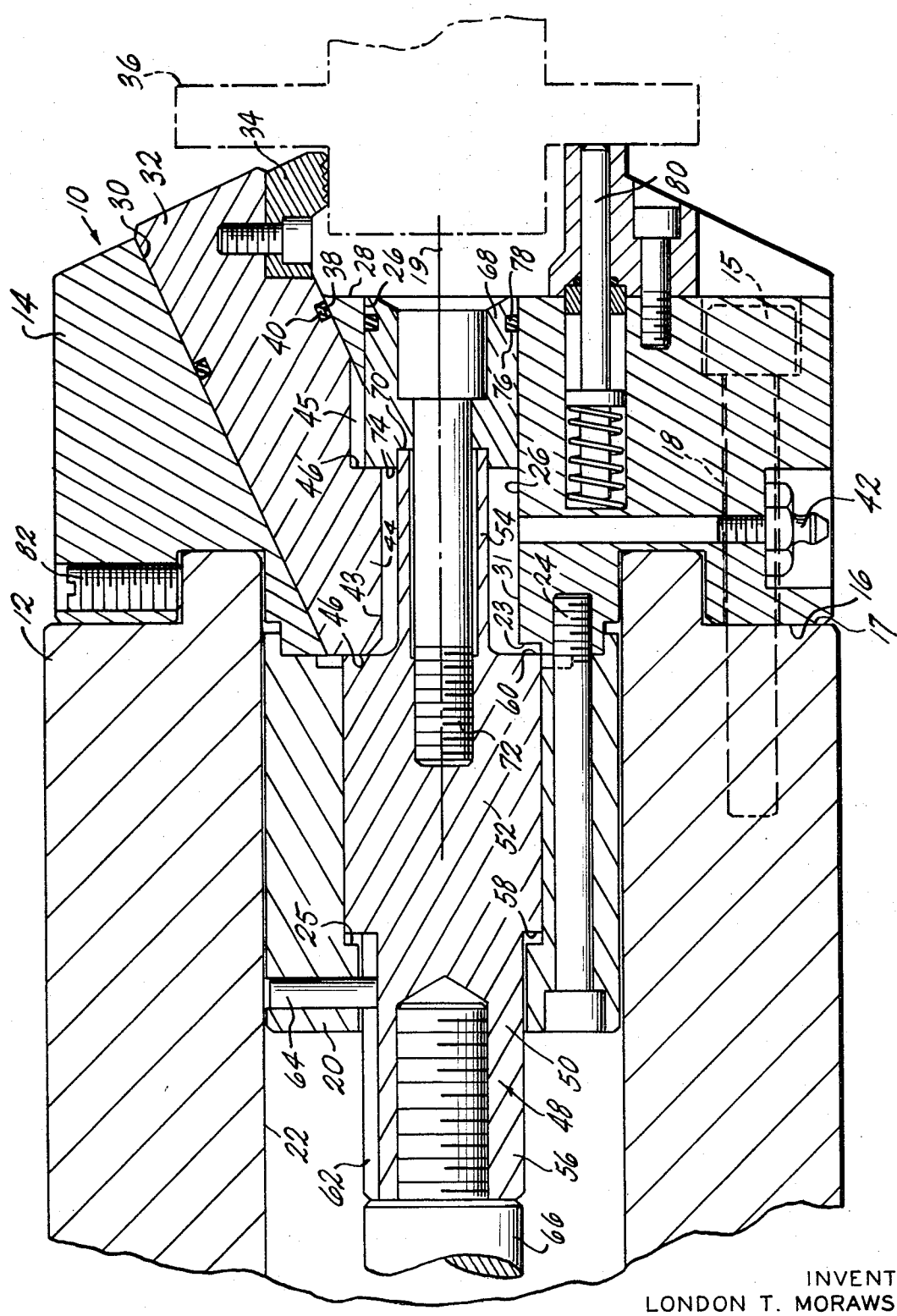
INVENTOR
LONDON T. MORAWSKI
JOHN J. PARKER
BY
Barnes, Kisselle, Raisch & Choate
ATTORNEYS

MULTI-JAW CHUCK

This invention relates to chucks and particularly to multi-jaw chucks of the drawbar type especially adapted for holding castings and forgings.

When a chuck of this type is used with a machine tool such as a lathe it is often necessary to replace the entire chuck when a different sized workpiece is being machined since the chuck jaws are not readily replaceable.

It is therefore the principal object of this invention to provide a multi-jaw chuck in which the jaws may be readily replaced from the front of the chuck.

Another important object of this invention is the provision of a multi-jaw chuck of simple yet rigid construction in which the chuck jaws are retained in the chuck body by means of a plug which is readily removable from the front of the chuck so as to allow quick replacement of the chuck jaws.

Other features and objects of the invention will become apparent from the accompanying description and drawing in which:

The drawing illustrates a sectional view through the axis of a chuck made in accordance with the present invention.

In the drawing, a chuck 10 of the present invention is shown coaxially mounted on a spindle 12 of a machine tool (not shown). Chuck 10 comprises a generally cylindrical body 14 attached to spindle 12 by means of bolts 15 and having its rear face 16 abutting front face 17 of spindle 12. Bolts 15 extend through clearance holes 18 which are circumferentially arranged in body 14 about axis 19. A body extension 20 projects within inner bore 22 of spindle 12 and is bolted to body 14 as at 24. A shoulder 23 is provided in body 14, adjacent the attachment of extension 20 thereto, and a shoulder 25 is formed at the rear of extension 20. While body 14 and body extension 20 could be formed as one body from a single piece of stock the particular construction disclosed is more readily and economically fabricated.

A central axial bore 26 extends rearwardly from front face 28 of the chuck. A plurality of preferably three cylindrical bores 30 are arranged in body 14. Bores 30 are circumferentially spaced equally about axis 19 and therefore only one bore is shown in the drawing. Bores 30 extend rearwardly from the front of the chuck and are similarly inclined radially inwardly in the rearward direction so as to have their rearward portions communicating with the rearward portion 31 of bore 26.

Slidably arranged within each bore 30 is a jaw carrier rod 32. The forward end of each rod 32 is suitably machined to accept a jaw 34 for gripping a workpiece 36. An O-ring 38 is seated in a circumferential groove 40 on rod 32 for sealing lubricant introduced to chuck 10 through a fitting 42. The rearward end of each rod 32 is obliquely truncated as at 43 and provided with a notch 45 axially forward of the truncated portion. A flat 46 is also machined at the rear of the truncated portion. Such an arrangement defines a lug 44 on each rod 32 having parallel spaced-apart faces 46, 46'.

A slide assembly 48 is arranged for axial movement within body extension 20. Slide assembly 48 comprises a slide 50 which has an axially central cylindrical portion 52, a tubular forward extension 54 and a tubular rearward extension 56. The diameter of central portion 52 is greater than the diameters of both extensions 54 and 56 to thereby define shoulders 58 and 60. An axially extending slot 62 which is engaged by a pin 64 in body extension 20 serves to guide slide assembly 48 within extension 20 so that there is no relative rotation therebetween. Extension 56 is internally threaded for receiving a drawbar 66 on the machine tool.

A plug 68 is seated on the forward end of extension 54 as at 70 and is detachably secured to slide assembly 48 by means of a bolt 72. The outside diameter of plug 68 conforms to the diameter of bore 26 in which it is slidably arranged. The diameter of plug 68 is also greater than the diameter of extension 54 so that the rear end of plug 68 forms an annular shoulder 74. A groove 76 on plug 68 accommodates an O-ring seal 78.

Chuck 10 is so dimensioned that shoulders 60 and 74 interengage faces 46, 46' respectively, of lugs 44 when plug 68 is secured to slide assembly 48.

Spring loaded ejectors 80 are provided in body 14 for the purpose of forcibly ejecting workpieces 36 from chuck 10 when the chuck is released from the engaged position illustrated in the drawing. A plurality of three set screws 82 are circumferentially spaced about axis 19 and are adapted to center chuck 10 on spindle 12 so that its rotation is concentric with that of spindle 12.

Chuck 10 of the present invention is mounted on spindle 12 by inserting assembled body 14 and body extension 20 within bore 22 until faces 16 and 17 abut. Set screws 82 are adjusted to center chuck 10 on spindle 12. Chuck 10 is then firmly secured to spindle 12 by tightening bolts 15. Drawbar 66 is attached to extension 56 forming an operative connection to slide assembly 48.

In order to actuate chuck 10 to the engaged position as shown in the drawing, drawbar 66 is axially shifted to the left. The engagement of shoulder 74 with lugs 44 shifts rods 32 to the left and radially inwardly as established by the inclination of bores 30 until workpiece 36 is gripped by jaws 34. Since rods 32 are almost entirely supported within bores 30, this particular construction is very rigid. Furthermore, the radial clearance between lugs 44 and extension 54 and a very slight axial clearance between shoulder 60 and lugs 44 permits a slight rotation of rods 32 within bores 30 so as to compensate for surface irregularities in workpiece 36.

During shifting, lugs 44 are constrained by shoulders 60 and 74 for radial movement relative to slide assembly 48 and plug 68. The engagement of shoulder 58 with shoulder 25 establishes the rearward limit of travel of slide assembly 48, while the engagement of shoulder 60 with shoulder 23 establishes the forward limit of travel of slide assembly 48.

Once chuck 10 is installed in spindle 12, rods 32 may be readily replaced by unfastening bolt 72 from slide assembly 48. Plug 68 is then removed from bore 26 so that lugs 44 are no longer interengaged with slide assembly 48. Rods 32 are thereby rendered freely retractable from the front of chuck body 14 and may be replaced by other rods for accommodating a different sized workpiece.

We claim:

1. A chuck adapted to be mounted on the rotary spindle of a machine tool for retaining a workpiece thereon comprising a chuck body having a central axis concentric with the rotary axis of the spindle, a plurality of bores extending rearwardly from the front of said body and spaced circumferentially about said central axis, each of said bores being similarly inclined axially at an acute angle relative to said central axis, a jaw rod slideably arranged in each of said bores, said rods projecting forwardly of the front face of said body and having jaws at the forward ends thereof, said body having a central bore extending axially therethrough, said jaw rods each having a lug adjacent the rear end thereof projecting radially into said central bore, a jaw actuator axially shiftable in said central bore, said jaw actuator having a forwardly facing radial shoulder thereon abutting the rear end of each of said radial lugs, retainer means insertable and removable through the front end of said central bore and having a rearwardly facing radial shoulder thereon abutting the forward end of each lug and removable fastening means accessible from the front end of said central bore for interconnecting said retainer means and said actuator in axially fixed relation relative to one another whereby to axially trap said abutments between said shoulders, said abutments being movable radially while trapped between said shoulders whereby said jaws are displaced radially and axially in response to axial reciprocation of said jaw actuator when the abutments are trapped between the shoulders on said actuator and retaining means.

2. The combination called for in claim 1 wherein said retainer means comprises a plug.

3. The combination called for in claim 2 wherein said plug is cylindrical in shape and guided for axial movement within said central bore.

4. A chuck adapted to be mounted on the rotary spindle of a machine tool for retaining a workpiece thereon comprising a chuck body having a central axis concentric with the rotary axis of the spindle, a plurality of bores extending rearwardly from the front of said body and spaced circumferentially about said central axis, each of said bores being similarly inclined axially at an acute angle relative to said central axis, a jaw rod slideably arranged in each of said bores, said rods projecting forwardly of the front face of said body and having jaws at the forward ends thereof, said body having a central bore extending axially therethrough, a jaw actuator axially shiftable in said central bore and a plug insertable and removable through the front end of said central bore for interengaging and disengaging said jaw actuator and said jaw rods, said jaws being displaced radially and axially in response to axial reciprocation of said jaw actuator when the latter is interengaged with said jaw rods, said jaw rods including lugs projecting radially inwardly for interengagement with the rearward end of said plug and said actuator, said plug being cylindrical in shape and said jaw actuator comprising a cylindrical axially central portion having a diametrically reduced forward extension thereon thereby defining an annular shoulder on the forward end of said central portion, said plug having a diameter greater than the diameter of said forward extension and being connected to the forward end of said forward extension, said lugs being interengaged by said annular shoulder and said plug.

5. The combination called for in claim 4 wherein said lugs have axially spaced apart parallel faces abutting said shoulder and said plug respectively for radial sliding movement relative thereto in response to axial movement of said jaw actuator.

6. The combination called for in claim 1 wherein said plurality of bores are inclined radially inwardly in the rearward direction.

7. The combination called for in claim 1 wherein said plurality of bores comprises three bores circumferentially equally spaced about said body axis.

8. The combination called for in claim 2 wherein said fastening means comprises a screw extending axially through said plug and threaded into said actuator.

9. The combination called for in claim 2 wherein the actuator has a radially reduced portion extending forwardly from said shoulder thereon to said plug for maintaining the axial distance between said forwardly and said rearwardly facing shoulders at a fixed dimension when the actuator and said plug are interconnected by said fastening means.

* * * * *